(12) United States Patent
Katcher

(10) Patent No.: US 10,393,187 B2
(45) Date of Patent: Aug. 27, 2019

(54) SHAFT SEIZE RING

(71) Applicant: SAFRAN ELECTRICAL & POWER, Blagnac (FR)

(72) Inventor: Thomas E. Katcher, Euclid, OH (US)

(73) Assignee: SAFRAN ELECTRICAL & POWER, Blagnac (FR)

( * ) Notice: Subject to any disclaimer, the term of this patent is extended or adjusted under 35 U.S.C. 154(b) by 14 days.

(21) Appl. No.: 15/648,390

(22) Filed: Jul. 12, 2017

(65) Prior Publication Data

US 2018/0038419 A1    Feb. 8, 2018

Related U.S. Application Data

(60) Provisional application No. 62/371,398, filed on Aug. 5, 2016.

(51) Int. Cl.
*F16D 7/02* (2006.01)
*F16D 9/06* (2006.01)
(Continued)

(52) U.S. Cl.
CPC ............. *F16D 7/021* (2013.01); *F16D 9/06* (2013.01); *F16D 59/00* (2013.01); *F16D 2127/005* (2013.01)

(58) Field of Classification Search
CPC ........... F16D 2300/02; F16D 2300/021; F16D 2300/0214; F16D 2300/06; F16D 2300/10;
(Continued)

(56) References Cited

U.S. PATENT DOCUMENTS 3,220,218 A    11/1965  Rio et al.
3,620,046 A  * 11/1971  Clark .................. F16D 9/08
                                                464/33
(Continued)

FOREIGN PATENT DOCUMENTS

FR    2315036 A1    1/1977
FR    2947218 A1    12/2010

OTHER PUBLICATIONS

International Search Report and Written Opinion dated Oct. 16, 2017, 13 pages.

*Primary Examiner* — Jacob S. Scott
*Assistant Examiner* — James J Taylor, II
(74) *Attorney, Agent, or Firm* — Rankin, Hill & Clark LLP

(57) ABSTRACT

A disconnect mechanism includes a shaft that rotationally couples a prime mover and a driven element together. The disconnect mechanism also includes a first bearing that rotationally supports the shaft and a first seize ring rigidly attached to the shaft. The first seize ring coaxially surrounds at least a portion of the shaft. The disconnect mechanism also includes a housing that retains the first bearing. The housing includes a first contact member that is fixed with relation to the shaft. The first contact member is concentrically spaced from the first seize ring during the normal operation of the shaft and selectively contacts the first seize ring when the centerline control of the shaft is not maintained. The disconnect mechanism also includes a torque activated disconnect element that rotationally decouples the prime mover and the driven element from one another when the first seize ring contacts the first contact member.

19 Claims, 9 Drawing Sheets

(51) Int. Cl.
*F16D 59/00* (2006.01)
*F16D 127/00* (2012.01)

(58) Field of Classification Search
CPC ...... F16D 2300/24; F16D 49/08; F16D 49/22; F16D 2066/001; F16D 2066/003; F16D 2066/006; F16D 67/02; F16D 2069/002; F16D 2069/003; F16D 71/02; F16D 43/26; F16D 65/14; F16D 2127/004; F16D 2127/005
See application file for complete search history.

(56) References Cited

U.S. PATENT DOCUMENTS

| | | | | |
|---|---|---|---|---|
| 6,260,667 B1 * | 7/2001 | Sugden | ............... | F16D 59/00 |
| | | | | 188/31 |
| 7,598,642 B2 * | 10/2009 | Scherzinger | ............ | F16C 19/52 |
| | | | | 310/90 |
| 8,122,781 B2 * | 2/2012 | Minke | .................. | F16D 9/06 |
| | | | | 464/30 |
| 8,432,079 B2 * | 4/2013 | Lemmers, Jr. | ........ | H02K 7/116 |
| | | | | 310/100 |
| 9,447,822 B2 * | 9/2016 | Rittmeyer | ............ | H02K 5/1732 |
| 2004/0262096 A1 * | 12/2004 | Hageman | .............. | F16D 65/847 |
| | | | | 188/71.6 |

\* cited by examiner

SHAFT SEIZE RING

BACKGROUND

This disclosure relates to power distribution assemblies, and more particularly to disconnect mechanisms which rotationally couple a prime mover and a driven element together.

A driven element (aka driven equipment), such as electrical generators, pumps, and compressors are rotationally connected to a prime mover (aka power source), such as a main engine of an aircraft. This connection can occur with a shaft, also known as a drive shaft. While driven element is generally very reliable, it will be appreciated that there are times when the driven element may fail. Particularly in aircraft applications there is a need for the driven element to fail in a safe manner. However, the prime mover is not aware of a failure of a bearing in the driven element. Thus, the prime mover will continue to provide power to the failed driven element. Depending upon the failure mode, this continued supply of power can create an unsafe condition.

Further, this failure can cause increased stress to be placed on the prime mover. Additionally, when the driven element fails, it is sometimes possible for the internal components of the driven element to continue to rotate. However, this post-failure rotation mode can be especially taxing on the prime mover. Further still, this rotation of the internal components of the prime mover, in the post-failure mode, can result in additional damage occurring to the driven element. Thus, many devices and methods have been used in order to predict when a failure of the driven element would occur.

As is done with many aviation components, the driven element could be changed prior to failure based upon a preventative maintenance schedule. As will be appreciated, this schedule may not account for the exact conditions which have been subjected to the driven element. Thus, there is the chance that the driven element will not be changed before it would fail. Alternatively, there is also the chance that the driven element may be changed well before it fails, thereby sacrificing or wasting useful remaining life of the driven element. This results in increased maintenance costs and downtime.

Alternatively, some systems utilize a variety of sensors disposed within on near to the driven element. These sensors may measure, for example, temperature and/or vibration of the driven element or the surrounding area. Then, through a predictive model, an estimate is made of when the driven element may fail based upon the data obtained from the sensors. As such, the driven element can be changed prior to the estimated failure time. However, it is very expensive and time consuming to install these additional sensors in an attempt to determine when the driven element may fail. Further, these sensors and related computing equipment add additional weight to the aircraft.

Thus, to avoid the negative issues associated with a failure of the driven element, a user is forced to either preventatively change the driven element based upon a maintenance schedule or rely on expensive sensors to predict when the driven element may fail. Further, the aforementioned methods fail to address the situation of rapidly occurring types of bearing failure modes where the predictive maintenance system cannot respond in time to prevent failure of the entire assembly.

SUMMARY

In view of the foregoing, a disconnect mechanism includes a shaft that rotationally couples a prime mover and a driven element together. The shaft defines a radial centerline that extends along a longitudinal axis. The disconnect mechanism also includes a first bearing that rotationally supports the shaft so as to provide radial centerline control of the shaft to define a normal operation of the shaft, and a first seize ring rigidly attached to the shaft. The first seize ring coaxially surrounds at least a portion of the shaft. The disconnect mechanism also includes a housing that retains the first bearing. The housing includes a first contact member that is fixed with relation to the shaft. The first contact member is concentrically spaced from the first seize ring during the normal operation of the shaft and selectively contacts the first seize ring when the centerline control of the shaft is not maintained. The disconnect mechanism also includes a torque activated disconnect element that rotationally decouples the prime mover and the driven element from one another when the first seize ring contacts the first contact member.

According to another aspect, a power distribution assembly that includes a prime mover that provides rotational energy, a driven element that is powered by the prime mover, and a disconnect mechanism. The disconnect mechanism includes a shaft that rotationally couples the prime mover and the driven element together, a first bearing and a second bearing that rotationally support the shaft, a first seize ring that coaxially receives the shaft, and a housing that rotationally supports the first bearing and the second bearing. The housing includes a first contact member that selectively contacts the first seize ring. The first seize ring is adapted to thermally expand in an outwardly radial manner after contact with the first contact member so as to prevent rotation of the shaft.

DETAILED DESCRIPTION

Figure 1:
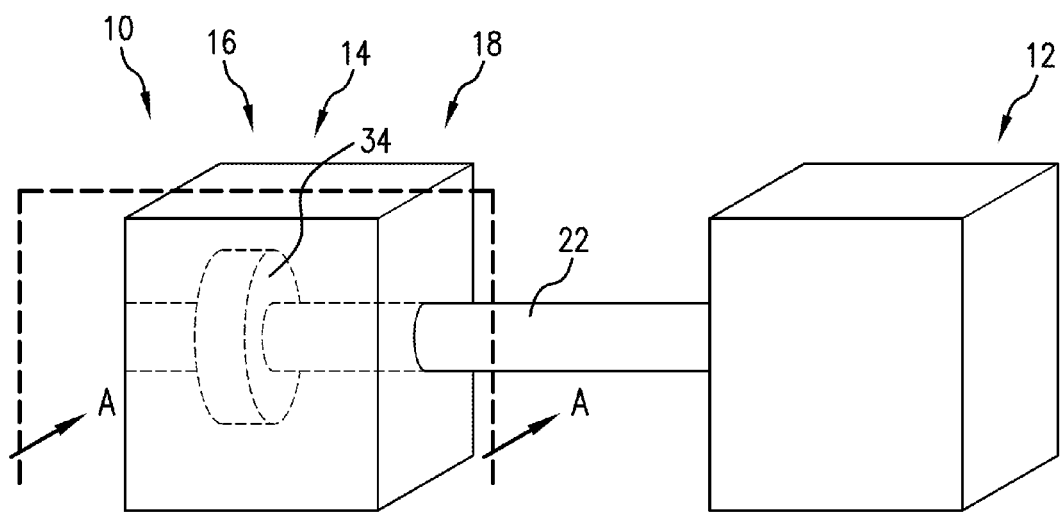
FIG. 1 is a schematic view of a power distribution assembly.
Figure 2:
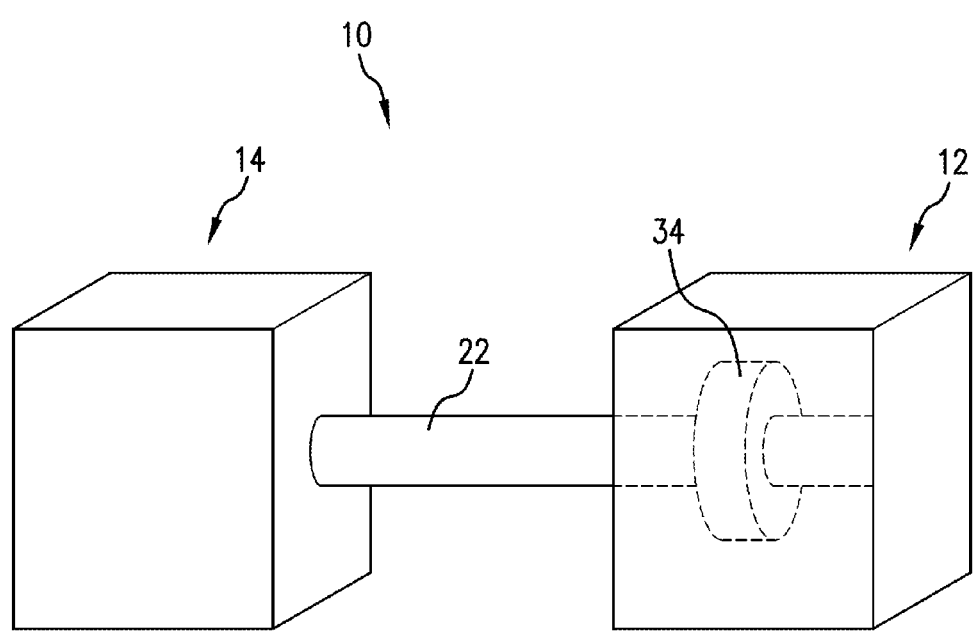
FIG. 2 is a schematic view of an alternate power distribution assembly.

FIG. 1 depicts a schematic view of a power distribution assembly 10. The power distribution assembly 10 includes a prime mover 12 and driven element 14. The prime mover 12 provides rotational energy to the driven element 14. Stated another way, the driven element 14 is powered by the prime mover 12. The power distribution assembly 10 includes a disconnect mechanism 16 with a torque activated disconnect element 34. The torque activated disconnect element 34 may be disposed within the driven element 14. Alternatively, as shown in FIG. 2, the torque activated disconnect element 34 may be disposed within the prime mover 12. Further still, as shown in FIG. 3, the torque activated disconnect element 34 may be disposed so as to be external to the prime mover 12 and the driven element 14.

Figure 3:
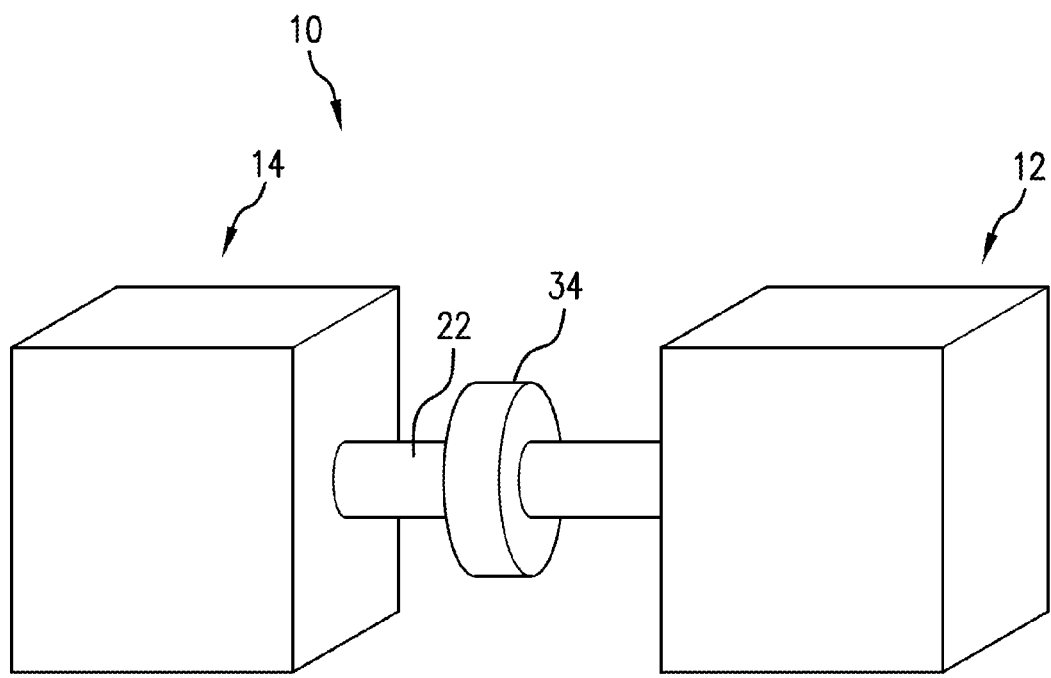
FIG. 3 is a schematic view of an alternate power distribution assembly.
Figure 4:
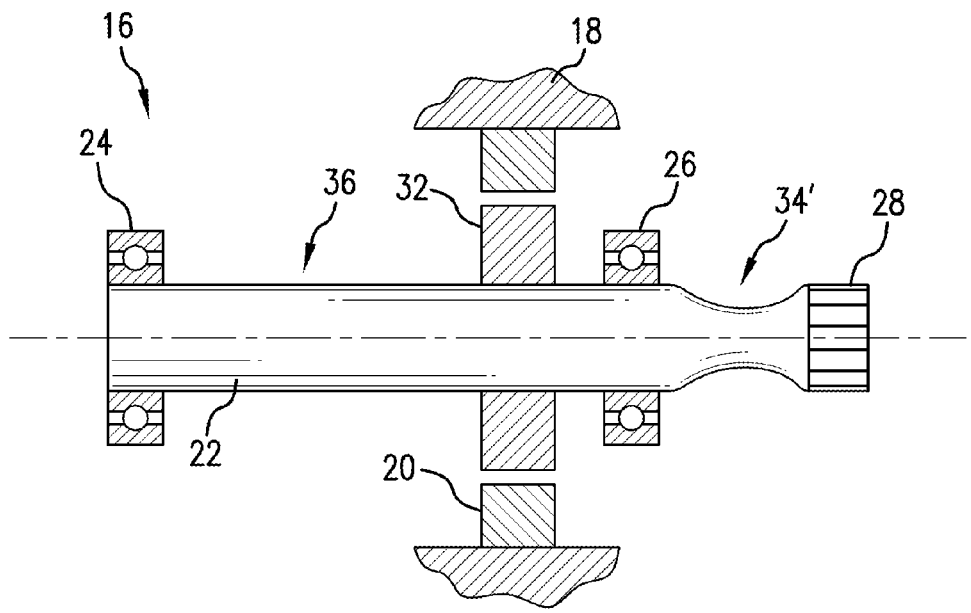
FIG. 4 is a partial sectional view taken along line A-A of FIG. 1 of a disconnect mechanism in normal operation where centerline control is maintained.
Figure 5:
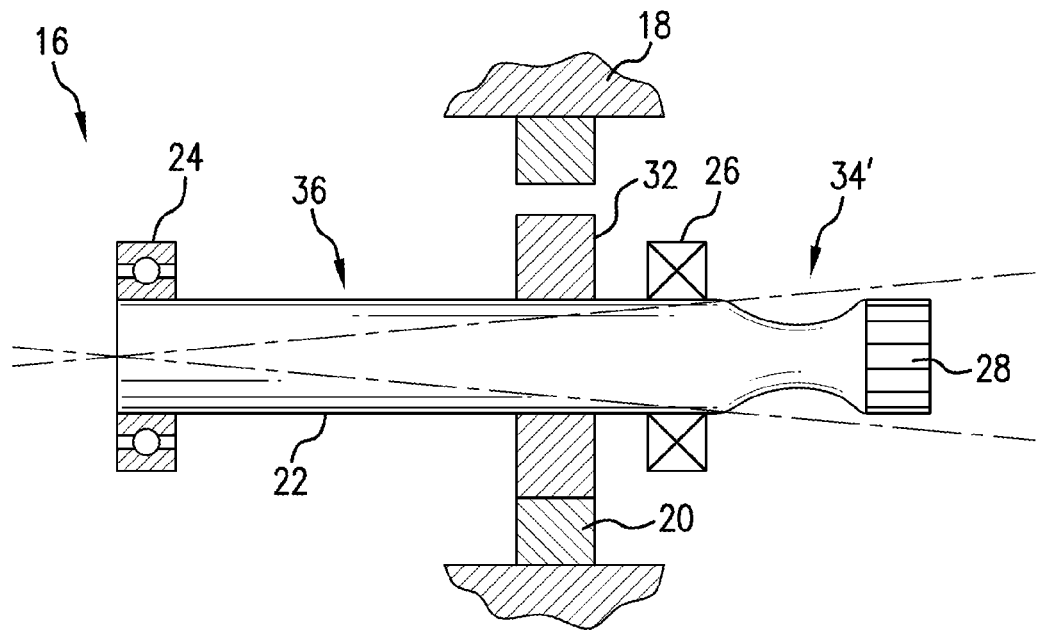
FIG. 5 is a partial sectional view taken along line A-A of FIG. 1 of the disconnect mechanism in which centerline control has not been maintained.
Figure 6:
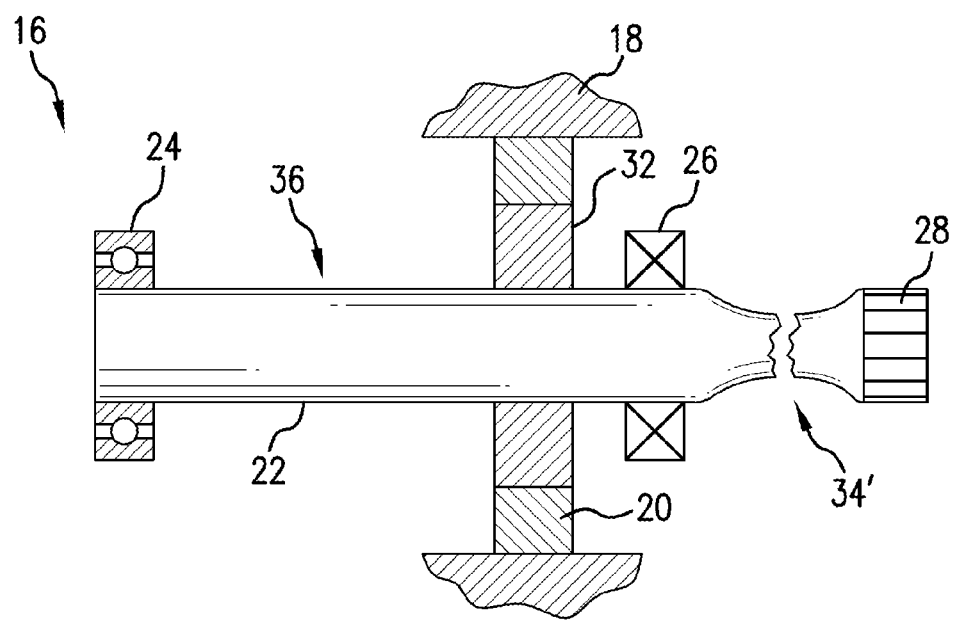
FIG. 6 is a partial sectional view taken along line A-A of FIG. 1 of the disconnect mechanism in which the shaft has broken.

The torque activated disconnect element 34 is shown in schematic form in FIGS. 1-3. However, as will be appreciated, the torque activated disconnect element 34 could be in the form of numerous layouts without departing from the scope of the disclosure. For example, the torque activated disconnect element 34 could be a shear neck portion 34' as illustrated in FIGS. 4-6. Numerous other torque activated disconnect elements 34 will be discussed in more detail hereinafter.

With reference to FIG. 4, the disconnect mechanism 16 includes a housing 18 with a first contact member 20 and a shaft 22. The shaft 22 is rotationally supported by at least a first bearing 24. The shaft 22 can also be supported by a second bearing 26. Further, the shaft 22 can include a splined end 28. Additionally, the shaft 22 includes a first seize ring 32.

While the prime mover 12 is shown schematically in FIGS. 1-3, it will be appreciated that the prime mover 12 could be any number of elements, such as, for example an aircraft engine or other prime mover. Further, it will also be appreciated that the driven element 14 could also be any number of devices, including for example, an electrical generator, pump, or compressor for an aircraft. Nevertheless, it is envisioned that the power distribution assembly 10 could be utilized in any number of environments in which a prime mover and a driven element are rotationally coupled together.

As shown, the housing 18 is disposed within the driven element 14. However, as noted hereinbefore, the housing 18 could be located external to the driven element 14. It will also be appreciated that the housing 18 could be integrated within the prime mover 12 without departing from the scope of this disclosure. It is also noted that the first contact member 20 of the housing 18 is fixed with relation to the shaft 22.

The first contact member 20 may be of a similar longitudinal length as the first seize ring 32. The purpose and function of the first contact member 20 is solely for selective contact with the first seize ring 32. This contact may occur when centerline control of the shaft 22 is not maintained or when the first seize ring 32 increases in outer diameter due to thermal expansion. The first contact member 20 is specially designed so as to rapidly increase the temperature of the first seize ring 32 when contact between the objects occurs.

Further, as the purpose of the first contact member 20 is limited to selective contact with the first seize ring 32, the first contact member 20 is designed to so as to not cause undue or further damage to the power distribution assembly 10 upon contact with the first seize ring 32. The first contact member 20 can at least partially circumferentially surround the first seize ring 32. The first contact member 20 may be made from any number of materials including, for example, steel, stainless steel, and aluminum. Further, the first contact member 20 may be made of a material that has a rate of thermal expansion that is less than the material of which the seize ring is made.

As noted hereinbefore, the disconnect mechanism 16 also includes the shaft 22. The shaft 22 rotationally couples the prime mover 12 and the driven element 14 together. The shaft longitudinally extends between the prime mover 12 and the driven element 14. The shaft 22 can have a generally circular cross-section. The shaft 22 can be made from any number of materials, including for example, steel, stainless steel, nickel super alloys, and aluminum. The shaft 22 defines a radial centerline that extends along a longitudinal axis (i.e., extending in a left-right direction in FIG. 4).

The first bearing 24 rotationally supports the shaft 22 so as to provide radial centerline control of the shaft 22 to define a normal operation of the shaft 22, as will be described in more detail hereinafter. The second bearing 26 can cooperate with the first bearing 24 to rotationally support and provide centerline control of the shaft 22. The housing 18 retains and rotationally supports the first bearing 24 and the second bearing 26. Thus, failure of the first bearing 24 and/or the second bearing 26 can result in a loss of centerline control of the shaft 22.

The first bearing 24 and the second bearing 26 can be of the same type. As illustrated, the first bearing 24 and the second bearing 26 could be rolling-element bearings. However, it will be appreciated that other types of bearings are possible without departing from the scope of the disclosure. As is known, bearings include an inner race and an outer race, with bearing element(s) radially disposed therebetween. One of the common characteristics of all bearing failures is a loss of centerline control. Specifically, the clearance in the bearing increases during the failure and the shaft will drop or orbit within the increased clearance. This situation is shown in FIG. 5.

The shaft 22 may include the splined end 28 for connection to the prime mover 12. As shown in FIGS. 2-4, the splined end 28 is disposed at an end of the shaft 22 that is opposite the end near the second bearing 26. The splined end 28 allows for the addition of longitudinal extensions (not shown) to be attached to the shaft 22.

With attention to FIGS. 4-6 and 13, the first seize ring 32 is shown. The first seize ring 32 is rigidly attached to the shaft 22 and coaxially surrounds at least a portion of the shaft 22. In fact, the first seize ring 32 could completely surround a radial perimeter of the shaft 22 in a select longitudinal portion of the shaft 22. The first seize ring 32 is disposed so as to be longitudinally between the first bearing 24 and the second bearing 26. For reference, the shaft 22 and the first seize ring 32 can be made of different materials.

As shown in FIG. 4, the first seize ring 32 and the first contact member 20 have a same width in the longitudinal direction (left to right). This same width ensures good contact between the components when centerline control of the shaft 22 is not maintained. Thus, the prime mover 12 and the driven element 14 can be promptly disconnected from one another as will be described hereinafter. Further, as is also shown in FIG. 4, the first seize ring 32 and the first contact member 20 are radially spaced from one another so that no contact occurs between these two elements when centerline control of the shaft 22 is maintained.

The first seize ring 32 is constructed of a first material, whereas the first contact member 20 is constructed of a second material. The first material may have a thermal expansion coefficient that is greater than a thermal expansion coefficient of the second material. The first material, i.e., the material of which the first seize ring 32 is made, may be aluminum, steel, stainless steel, or brass.

Further, the first material and the second material may be adapted to gall upon contact with one another. This galling occurs even during selective contact between the first seize ring 32 and the first contact member 20. Galling is a form of wear caused by adhesion between sliding surfaces, in this case the first seize ring 32 and the first contact member 20.

Galling is caused by a combination of friction and adhesion between the surfaces of the first seize ring 32 and the first contact member 20, which is then followed by slipping and tearing of crystal structure beneath the surface. This results in some material being stuck or even friction welded to the adjacent surface. Thus, portions of the first seize ring 32 can be deposited onto the first contact member 20. Alternatively, portions of the first contact member 20 can be deposited onto the first seize ring 32. This results in a radial clearance between the first seize ring 32 and the first contact member 20 being reduced.

Further, the first seize ring 32 is adapted to thermally expand in an outwardly radial manner after contact with the first contact member 20. This radially outward expansion of the first seize ring 32 results in further contact between the first seize ring 32 and the first contact member 20 until rotation of the shaft 22 is entirely prevented.

As illustrated in FIGS. 4-6 and 13, the first seize ring 32 is disposed so as to be longitudinally between the first bearing 24 and the second bearing 26. Because of this placement of the first seize ring 32 between the first bearing 24 and the second bearing 26, several advantages are realized. Initially, the first seize ring 32 is able to detect failure of either the first bearing 24 or the second bearing 26 more promptly than if the first seize ring 32 was disposed such that the first bearing 24 was longitudinally between the second bearing 26 and the first seize ring 32 or if the second bearing 26 was longitudinally between the first bearing 24 and the first seize ring 32. Further, as the longitudinal distance between the first bearing 24 and the second bearing 26 has already been set, the first seize ring 32 can be integrated into the assembly without increasing an overall length of the shaft 22.

Figure 7:
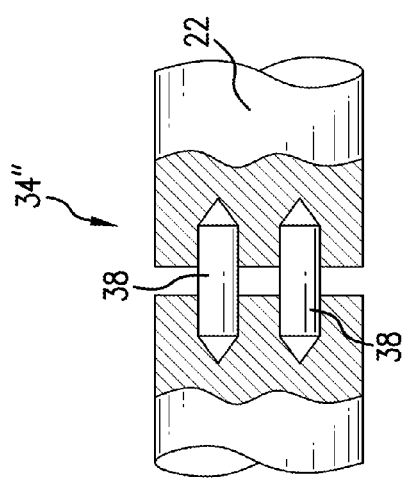
FIG. 7 is an elevation sectional view of an axial pin coupling.
Figure 8:
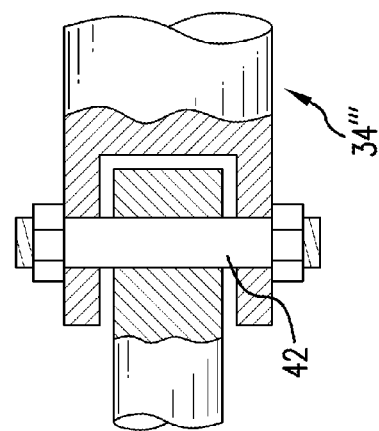
FIG. 8 is an elevation sectional view of a radial pin coupling.

As noted hereinbefore, the torque activated disconnect element 34 could be of any number of layouts, as for example shown in FIGS. 7-10. For example, the torque activated disconnect element 34 could be an axial shear pin portion 34" that includes at least one axial shear pin 38, as shown in FIG. 7. The axial shear pins 38 extend primarily in a direction so as to be parallel to the longitudinal axis defined by the shaft 22. Alternatively, the torque activated disconnect element 34 could be a radial shear pin portion 34'" with a radial shear pin 42, as illustrated in FIG. 8. In this arrangement, the radial shear pin 42 primarily extends in a direction generally perpendicular to the longitudinal axis defined by the shaft 22. The axial shear pins 38 and the radial shear pin 42 can have a shear strength that is less than a shear strength of the shaft 22.

Figure 9:
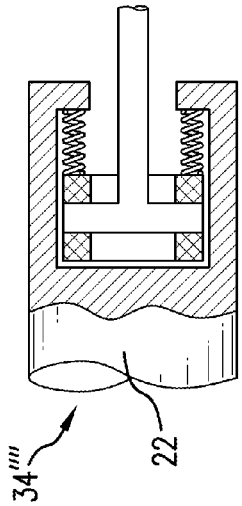
FIG. 9 is an elevation sectional view of an overrunning disk clutch.
Figure 10:
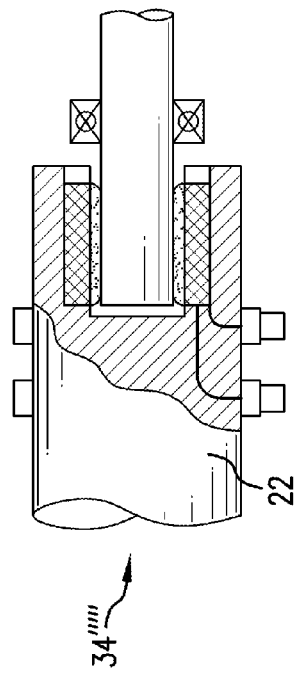
FIG. 10 is an elevation sectional view of a magnetic particle clutch.

Further still, the torque activated disconnect element 34 could be an overrunning disk clutch 34"", as shown in FIG. 9. The torque activated disconnect element 34 could alternatively be a magnetic particle clutch 34""', as illustrated in FIG. 10. The overrunning disk clutch 34"" and the magnetic particle clutch 34""' can be configured to disconnect the prime mover 12 from the driven element 14 when a torsion in the shaft 22 is greater than a predetermined value. As will be appreciated, this predetermined value would be set to a value that would prevent further damage to either the prime mover 12 or the driven element 14.

As shown in FIGS. 4-6, the torque activated disconnect element 34 could be a shear neck portion 34'. The shaft 22 defines the shear neck portion 34' and a non-shear neck portion 36. The shear neck portion 34' defines a shear neck diameter and the non-shear neck portion 36 defines a non-shear neck diameter. The diameter of the shear neck portion 34' is less than a diameter of the non-shear neck portion 36. As the shear neck portion 34' and the non-shear neck portion 36 are both part of the shaft 22, it will be appreciated that both portions 34', 36 can be made of the same material. The shear neck portion 34' is disposed so as to be longitudinally between the first bearing 24 and the splined end 28.

The second bearing 26 is disposed so as to be longitudinally between the first seize ring 32 and the torque activated disconnect element 34. Further, the first contact member 20 of the housing 18 is concentrically spaced from the first seize ring 32 during normal operation of the shaft 22. This concentric spacing ensures that contact between the first contact member 20 and the first seize ring 32 will not occur during normal operation of the power distribution assembly 10. Normal operation is defined as when centerline control of the shaft 22 is maintained and/or temperature of the power distribution assembly 10 is kept to a sufficiently low temperature for sustained operation. For reference, normal operation of the shaft 22 is illustrated in FIG. 4.

Whenever centerline control of the shaft 22 is maintained, the first bearing 24 and the second bearing 26 define a first bearing operating radial clearance and a second bearing operating radial clearance respectively. However, when the centerline control of the shaft 22 is not maintained, at least one of the first bearing 24 and the second bearing 26 defines a failed (or non-normal) bearing operating radial clearance. The failed bearing operating radial clearance is greater than the first bearing operating radial clearance or the second bearing operating radial clearance.

Thus, when the centerline control of the shaft 22 is maintained, the first contact member 20 is radially spaced from the shaft 22 a distance that is greater than the first bearing operating radial clearance or the second bearing operating radial clearance. However, when the centerline control of the shaft 22 is not maintained, the first contact member 20 is radially spaced from the shaft 22 a distance that is less than the first bearing operating radial clearance and the second bearing operating radial clearance.

The first seize ring 32 selectively contacts the first contact member 20 when centerline control of the shaft 22 is not maintained. As noted hereinbefore, this may be due to failure of either the first bearing 24 and/or the second bearing 26. It will be appreciated that failure of a bearing can be due to a number of reasons. These reasons may include the loss or deformation of individual roller bearing elements and/or breakage/deformation of an inner or outer race of the bearing.

For reference, a loss of centerline control of the shaft 22 is shown in FIG. 5. When the first contact member 20 contacts the first seize ring 32, thermal expansion of the first seize ring 32 occurs. This results in an interference fit between the first contact member 20 and the first seize ring 32 as is shown in FIG. 6. As will be appreciated, an interference fit is a fastening between two parts (in this case the first contact member 20 and the first seize ring 32), which is achieved by friction after the parts are pushed together, rather than by any other means of fastening.

As such, the shaft 22 near the torque activated disconnect element 34, e.g., the shear neck portion 34', is not rotating when the interference fit occurs. However, rotational energy is still being supplied by the prime mover 12. As such, the shaft 22 is adapted to torsionally shear at the shear neck portion 34' when the interference fit occurs, thereby rotationally disconnecting the prime mover 12 from the driven element 14, as shown in FIG. 6. Thus, the driven element 14 is operated a minimum amount of time post-failure. In fact, it is entirely possible that rotation of the shaft 22, and hence internal operating components (not shown) of the driven element 14 is ceased before the driven element 14 has completely failed.

Figure 11:
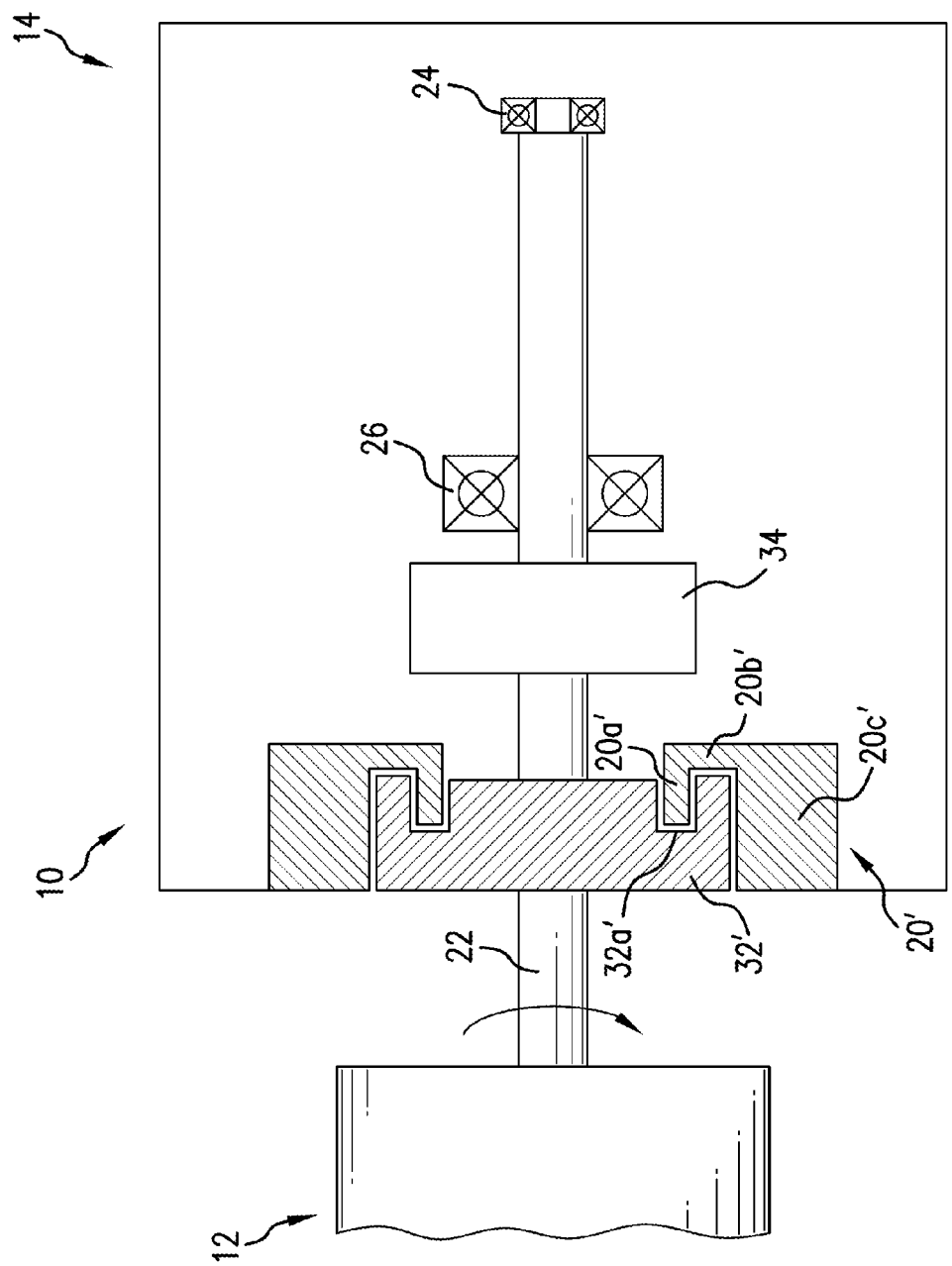
FIG. 11 is a schematic view of an alternate power distribution assembly.

With reference to FIG. 11, the power distribution assembly 10 is shown. The power distribution assembly 10 includes the prime mover 12 and the driven element 14. Additionally, the torque activated disconnect element 34 is mounted on the shaft 22 and shown in schematic form. The shaft 22 is rotationally supported by the first and second bearings 24, 26. Further, a labyrinth first contact member 20' and a labyrinth first seize ring 32' are shown. The labyrinth first contact member 20' and labyrinth first seize ring 32' cooperate to provide enhanced sealing capability for the driven element 14, while also providing the functionality and makeup of the first contact member 20 and first seize ring 32 as described hereinbefore. Further, the labyrinth first contact member 20' and the labyrinth first seize ring 32' are the same as the previously described first contact member 20 and first seize ring 32, except that the labyrinth first seize ring 32' defines a groove 32a' that circumferentially extends around the labyrinth first seize ring 32' for receipt of a blade 20a' of the labyrinth first contact member 20' to define a labyrinth seal.

The labyrinth first contact member 20' also includes a leg 20b' that connects a main body 20c' of the labyrinth first contact member 20' and the blade 20a' together. As will be appreciated, all of the components of the labyrinth first contact member 20' can be integral. The leg 20b' extends in a direction generally parallel to the shaft 22 and the main body 20c' is disposed radially outward from the first seize ring 32. The blade 20a' extends generally perpendicular to the shaft 22 so as to connect the leg 20b' and the main body 20c' together. As will also be appreciated, the previous description relating to the interaction between the first contact member 20 and first seize ring 32 during normal and non-normal operation is the same as the interaction between the labyrinth first contact member 20' and the labyrinth first seize ring 32'. It is noted that the labyrinth first contact member 20' and the labyrinth first seize ring 32' provide increased surface area for contact with one another as opposed to the first contact member 20 and the first seize ring 32, thereby providing enhanced functionality with regard to seizing capability.

Figure 12:
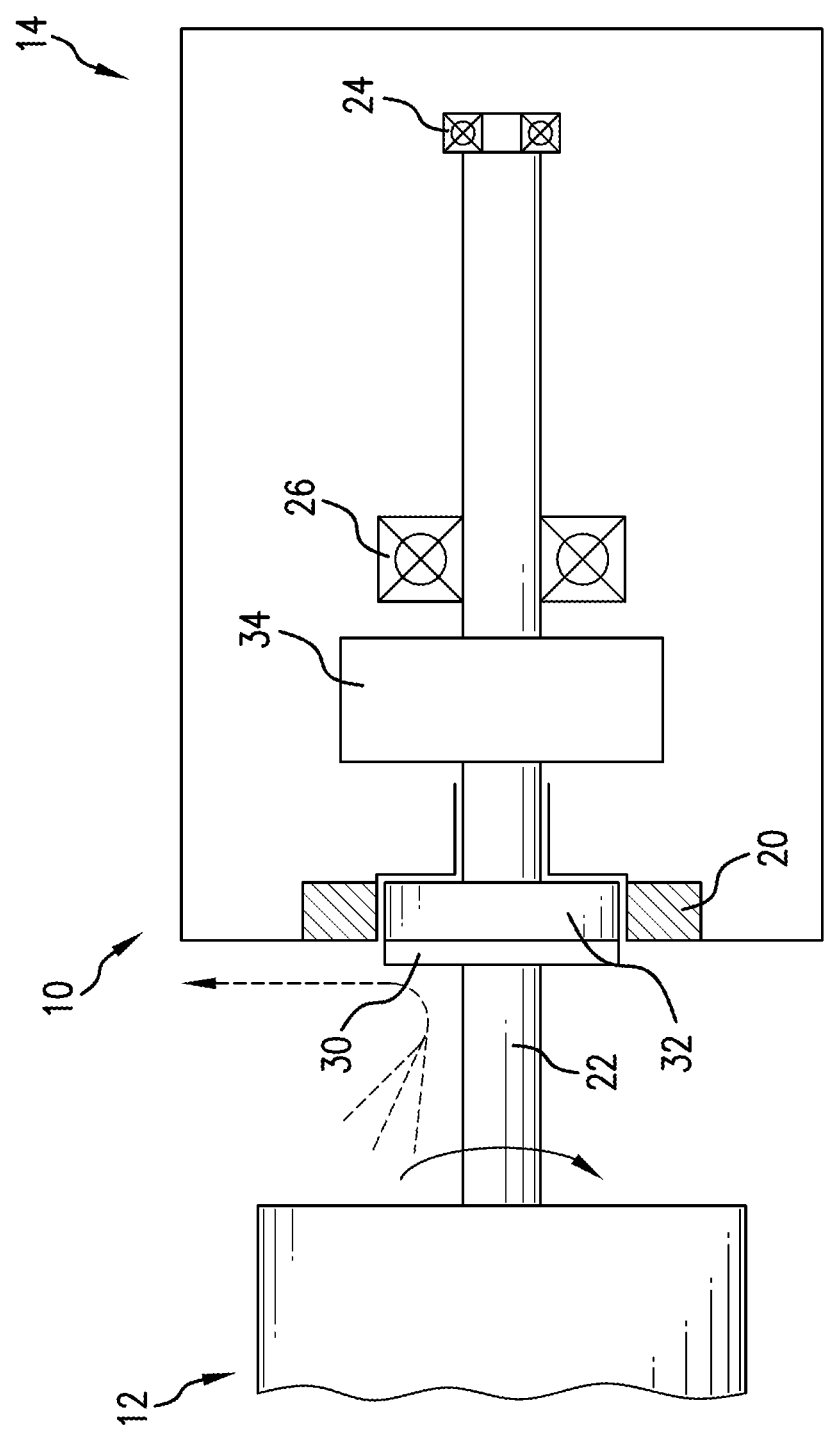
FIG. 12 is a schematic view of an alternate power distribution assembly.

With reference to FIG. 12, the power distribution assembly 10 is once again shown. The power distribution assembly 10 includes the prime mover 12 and the driven element 14. Additionally, the torque activated disconnect element 34 is mounted on the shaft 22 and shown in schematic form. The shaft 22 is rotationally supported by the first and second bearings 24, 26. Further, the first contact member 20 and the first seize ring 32 are shown. An oil slinger 30 can be directly attached to the first seize ring 32. As shown in FIG. 12, the first contact member 20 and the first seize ring 32 can have a same longitudinal width (i.e., left to right dimension in FIG. 12).

The oil slinger 30 longitudinally extends from the first seize ring 32 toward the prime mover 12, thereby resulting in a longitudinal projection. As illustrated, the oil slinger 30 defines an outer diameter that is equal to the outer diameter of the first seize ring 32. The oil slinger 30 cooperates with the first contact member 20 and the first seize ring 32 to improve the sealing capability of the power distribution assembly 10. Notably, as shown by the dashed arrow in FIG. 12, any contaminants located near the oil slinger 30 are slung radially outward and prevented from entering the driven element 14.

Figure 13:
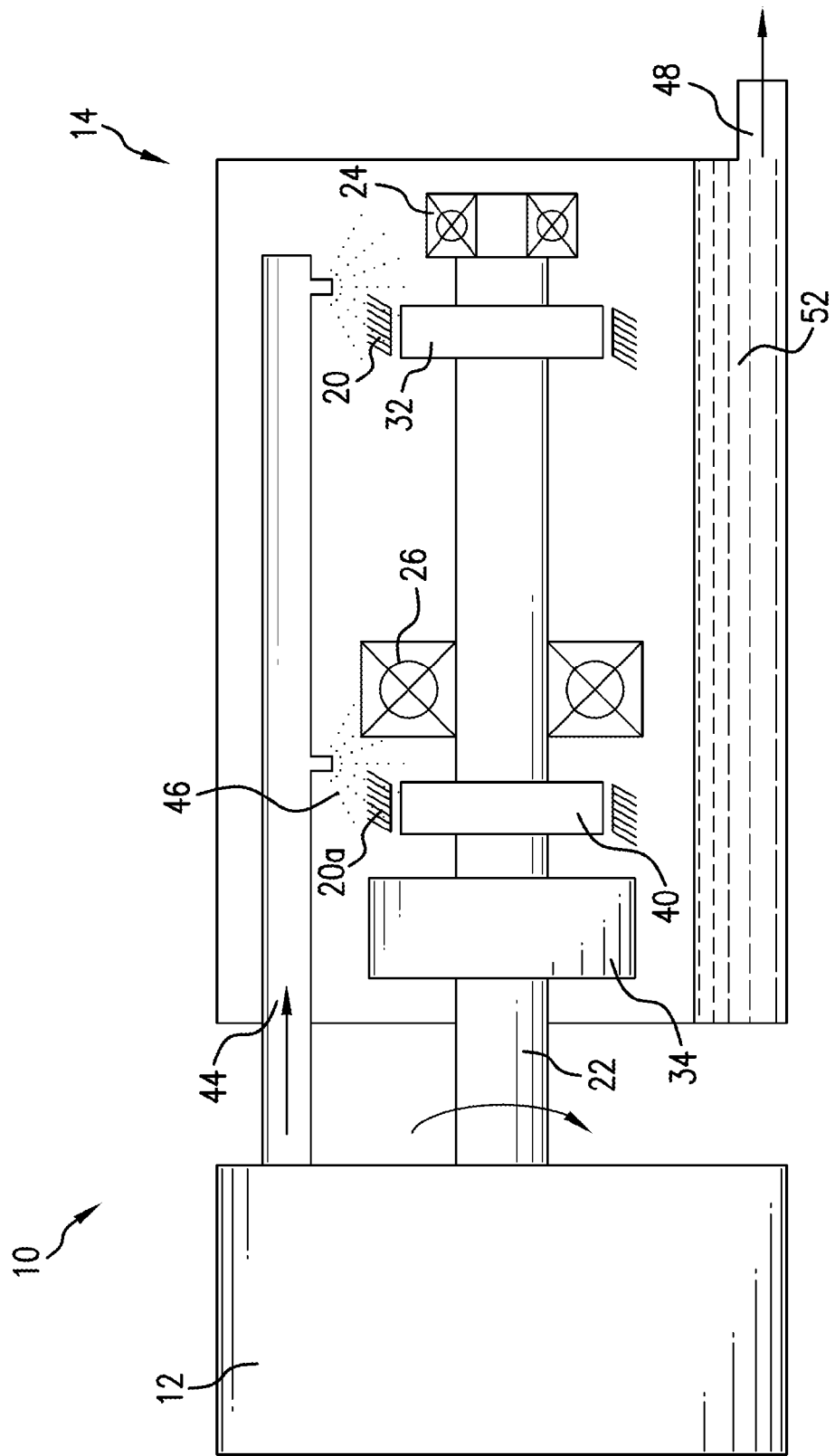
FIG. 13 is a schematic view of an alternate power distribution assembly.

With reference to FIG. 13, the power distribution assembly 10 is once again shown. The power distribution assembly 10 includes the prime mover 12 and the driven element 14. The torque activated disconnect element 34 is mounted on the shaft 22 and shown in schematic form. The shaft 22 is rotationally supported by the first and second bearings 24, 26. Further, the first contact member 20 and the first seize ring 32 are shown.

The driven element 14 can also include a second seize ring 40. The second seize ring 40 can be in addition to the first seize ring 32. The second seize ring 40 may also have the same dimensions, be made of the same material, and operate in the same manner as the first seize ring 32. For example, the first seize ring 32 can define an outer diameter that is equal to an outer diameter that is defined by the second seize ring 40. As illustrated, the second seize ring 40 is disposed between the torque activated disconnect element 34 and the second bearing 26. The second seize ring 40 can also be disposed between the torque activated disconnect element 34 and the first bearing 24.

Additionally, the second seize ring 40 can also be disposed between the torque activated disconnect element 34 and the first seize ring 32. The second seize ring 40 interacts with a second contact member 20a. Notably, the second seize ring 40 and second contact member 20a interaction is the same as the previously described interaction between the first seize ring 32 and the first contact member 20.

It will be appreciated that by having a first seize ring 32 interacting with the first contact member 20 and a second seize ring 40 interacting with the second contact member 20a, an improved performance can be noted. Additionally, it will also be appreciated that contact between the first seize ring 32 and the first contact member 20 and/or between the second seize ring 40 and the second contact member 20a will have the same result as if there was merely contact between the first seize ring 32 and the first contact member 20.

The driven element 14 can include an oil inlet 44 that is in fluid communication with the prime mover 12. The oil inlet 44 can be located near a top of the driven element 14 and allows for oil 46 to be dispensed onto the components within the driven element 14 for cooling and/or lubrication purposes. The oil 46 then collects in an oil sump 52. The oil sump 52 can be located near a bottom of the driven element 14 and is in fluid communication with an oil outlet 48. Although not explicitly shown in FIG. 13, it will be understood that the oil outlet 48 is fluidly connected to the prime mover 12 to return the oil 46 to the prime mover 12.

It will also be appreciated that other thermally driven failure mechanisms could disconnect the prime mover 12 and the driven element 14 from one another. For example, in an oil cooled machine, if flooding occurred, hot circulating oil would heat either the first seize ring 32 and/or the second seize ring 40, thereby causing radial expansion of the first seize ring 32 and/or the second seize ring 40. This would subsequently result in contact with the respective first contact member 20 and/or second contact member 20a. For reference, this radial expansion of the first seize ring 32 and/or the second seize ring 40 due to thermal overheating could be caused by a variety of reasons.

For example, it will be appreciated that non-constant contact between either the first seize ring 32 and the first contact member 20 and/or between the second seize ring 40 and the second contact member 20a could result in pieces of the components (i.e., the first seize ring 32, the first contact member 20, the second seize ring 40, and/or the second contact member 20a) being broken off from and resting near the oil outlet 48. These pieces would then prevent the oil 46 from leaving the oil sump 52 through the oil outlet 48. This would then cause a level of the oil 46 to dramatically rise within the driven element 14, thereby flooding the driven element 14.

As noted hereinbefore, post-failure rotation of the shaft can be especially taxing on an aircraft engine. Further, this rotation of the internal components of the driven element, in the post-failure mode, can result in additional damage occurring to the driven element. As driven element can many times be rebuilt or repaired after a failure, it is desirable for any additional damage to the driven element to be minimized. Thus, the present assembly allows for a rapid shutdown of the driven element 14, thereby minimizing labor and increased material costs associated with a more thorough rebuilding/repair of the driven element.

As is considered apparent, the apparatus described in this disclosure is a notable improvement over the conventional arrangements listed above due to its simplicity and robustness. No complex assemblies, electronics or programming logic is required to safely manage the bearing failure. Rather, simple parts and geometry are utilized which translates into lower manufacturing costs and also lower weight. As this system results in a substantially lower weight, as compared to a back-up bearing system, the operating cost for any aircraft that includes this system is lower.

A power distribution assembly has been described above with particularity. Modifications and alterations will occur to those upon reading and understanding the preceding detailed description. The invention, however, is not limited to only the embodiments described above. Instead, the invention is broadly defined by the appended claims and the equivalents thereof. Moreover, it will be appreciated that various of the above-disclosed and other features and functions, or alternatives or varieties thereof, may be desirably combined into many other different systems or applications, also that various presently unforeseen or unanticipated alternatives, modifications, variations, or improvements, therein may be subsequently made by those skilled in the art which are also intended to be encompassed by the following claims.

The invention claimed is:

1. A disconnect mechanism, comprising:
    a shaft that rotationally couples a prime mover and a driven element together, the shaft defining a radial centerline extending along a longitudinal axis;
    a first bearing that rotationally supports the shaft so as to provide radial centerline control of the shaft to define a normal operation of the shaft;
    a first seize ring rigidly attached to the shaft, the first seize ring coaxially surrounding at least a portion of the shaft;
    a housing that retains the first bearing, the housing including a first contact member that is fixed with relation to the shaft, wherein the first contact member is concentrically spaced from the first seize ring during the normal operation of the shaft and selectively contacts the first seize ring when the centerline control of the shaft is not maintained; and
    a torque activated disconnect element that rotationally decouples the prime mover and the driven element from one another when the first seize ring contacts the first contact member, wherein when the centerline control of the shaft is not maintained due to failure of the first bearing, the first contact member contacts the first seize ring so as to cause thermal expansion of the first seize ring there by resulting in an interference fit between the first contact member and the first seize ring.

2. The disconnect mechanism of claim 1, wherein the torque activated disconnect element includes a shear neck portion defining a shear neck diameter and a non-shear neck portion defining a non-shear neck diameter, wherein the shear neck diameter is less than the non-shear neck diameter.

3. The disconnect mechanism of claim 1, wherein the torque activated disconnect element includes at least one shear pin that has a shear strength that is less than a shear strength of the shaft.

4. The disconnect mechanism of claim 3, wherein the at least one shear pin primarily extends in a direction that is generally parallel to the longitudinal axis.

5. The disconnect mechanism of claim 3, wherein the at least one shear pin primarily extends in a direction that is generally perpendicular to the longitudinal axis.

6. The disconnect mechanism of claim 1, wherein the torque activated disconnect element includes a clutch that rotationally disconnects the prime mover from the driven element.

7. The disconnect mechanism of claim 1, wherein the first bearing is disposed such that the first seize ring is longitudinally between the first bearing and the torque activated disconnect element.

8. The disconnect mechanism of claim 1, wherein the torque activated disconnect element includes a clutch.

9. The disconnect mechanism of claim 1, further including a second bearing that cooperates with the first bearing to rotationally support the shaft, wherein the first seize ring is disposed so as to be longitudinally between the first bearing and the second bearing.

10. The disconnect mechanism of claim 9, further including a second seize ring rigidly attached to the shaft and longitudinally spaced from the first seize ring, the second seize ring coaxially surrounding at least a portion of the shaft and being disposed between the second bearing and the torque activated disconnect element.

11. The disconnect mechanism of claim 10, wherein the first seize ring defines a first seize ring outer diameter and the second seize ring defines a second seize ring outer diameter, and wherein the first seize ring outer diameter is equal to the second seize ring outer diameter.

12. The disconnect mechanism of claim 1, further comprising:
    an oil slinger that is directly attached to the first seize ring.

13. A disconnect mechanism, comprising:
    a shaft that rotationally couples a prime mover and a driven element together, the shaft defining a radial centerline extending along a longitudinal axis;
    a first bearing that rotationally supports the shaft so as to provide radial centerline control of the shaft to define a normal operation of the shaft;
    a first seize ring rigidly attached to the shaft, the first seize ring coaxially surrounding at least a portion of the shaft;
    a housing that retains the first bearing, the housing including a first contact member that is fixed with relation to the shaft, wherein the first contact member is concentrically spaced from the first seize ring during the normal operation of the shaft and selectively contacts the first seize ring when the centerline control of the shaft is not maintained; and a torque activated disconnect element that rotationally decouples the prime mover and the driven element from one another when the first seize ring contacts the first contact member, wherein the first seize ring is constructed of a first material and the first contact member is constructed of a second material, and wherein the first material has a thermal expansion coefficient that is greater than a thermal expansion coefficient of the second material.

14. The disconnect mechanism of claim 13, wherein the first material and the second material are adapted to gall upon contact with one another.

15. A power distribution assembly, comprising:
a prime mover that provides rotational energy;
a driven element that is powered by the prime mover; and
a disconnect mechanism that includes:
    a shaft that rotationally couples the prime mover and the driven element together,
    a first bearing and a second bearing that rotationally support the shaft,
    a first seize ring that coaxially receives the shaft, and
    a housing that rotationally supports the first bearing and the second bearing, the housing including a first contact member that selectively contacts the first seize ring, wherein the first seize ring is adapted to thermally expand in an outwardly radial manner after contact with the first contact member so as to prevent rotation of the shaft.

16. The power distribution assembly of claim 15,
wherein the first bearing and the second bearing rotationally support the shaft so as to provide radial centerline control of the shaft to define a normal operation of the shaft, wherein when the radial centerline control of the shaft is maintained, the first bearing and the second bearing define a first bearing operating radial clearance and a second bearing operating radial clearance, respectively, and when the radial centerline control of the shaft is not maintained, at least one of the first bearing and the second, bearing defines a failed bearing operating radial clearance; and
wherein the failed bearing operating radial clearance is greater than the first bearing operating radial clearance and the second bearing operating radial clearance.

17. The power distribution assembly of claim 16, wherein when the radial centerline control of the shaft is maintained, the first contact member is radially spaced from the shaft a distance that is greater than the first bearing operating radial clearance and the second bearing operating radial clearance.

18. The power distribution assembly of claim 16, wherein when the radial centerline control of the shaft is not maintained, the first contact member is radially spaced from the shaft a distance that is less than the first bearing operating radial clearance and the second bearing operating radial clearance.

19. The power distribution assembly of claim 15, wherein the first contact member includes a leg that extends in a direction generally parallel to the shaft, a main body disposed radially outward from the first seize ring, and a blade that extends generally perpendicular to the shaft so as to connect the leg and the main body together, and wherein the first seize ring defines a groove that circumferentially extends around the first seize ring so as to receive the blade of the first contact member to define a labyrinth seal.

* * * * *